United States Patent
Mangalam et al.

(10) Patent No.: US 11,447,129 B2
(45) Date of Patent: Sep. 20, 2022

(54) SYSTEM AND METHOD FOR PREDICTING THE MOVEMENT OF PEDESTRIANS

(71) Applicant: Toyota Research Institute, Inc., Los Altos, CA (US)

(72) Inventors: Karttikeya Mangalam, Berkeley, CA (US); Kuan-Hui Lee, San Jose, CA (US); Adrien David Gaidon, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 404 days.

(21) Appl. No.: 16/787,523

(22) Filed: Feb. 11, 2020

(65) Prior Publication Data

US 2021/0245744 A1   Aug. 12, 2021

(51) Int. Cl.
| | |
|---|---|
| *G06N 20/00* | (2019.01) |
| *B60W 30/095* | (2012.01) |
| *G06N 7/00* | (2006.01) |
| *G06N 3/02* | (2006.01) |
| *G08G 1/16* | (2006.01) |
| *G06V 20/58* | (2022.01) |
| *G06V 40/10* | (2022.01) |

(52) U.S. Cl.
CPC .......... *B60W 30/0956* (2013.01); *G06N 3/02* (2013.01); *G06N 7/005* (2013.01); *G06V 20/58* (2022.01); *G06V 40/10* (2022.01); *G08G 1/166* (2013.01); *B60W 2554/4029* (2020.02)

(58) Field of Classification Search
None
See application file for complete search history.

(56) References Cited

U.S. PATENT DOCUMENTS 9,766,626 B1 * 9/2017 Zhu ..................... G08G 1/166
9,805,474 B1   10/2017 Whiting et al.
(Continued)

FOREIGN PATENT DOCUMENTS

GB   2562049 A   7/2018
JP   2011070384 A   4/2011

OTHER PUBLICATIONS

Rehder et al., "Pedestrian Prediction by Planning using Deep Neural Networks," arXiv:1706.05904v2 [cs.CV] Jun. 20, 2017.
(Continued)

*Primary Examiner* — Brent Swarthout
(74) *Attorney, Agent, or Firm* — Christopher G. Darrow; Darrow Mustafa PC

(57) ABSTRACT

A system and related method for predicting movement of a plurality of pedestrians may include one or more processors and a memory. The memory includes an initial trajectory module, an exit point prediction module, a path planning module, and an adjustment module. The modules include instructions that when executed by the one or more processors cause the one or more processors to obtain trajectories of the plurality of pedestrians, predict future exit points for the plurality of pedestrians from a scene based on the trajectories of the plurality of pedestrians, determine trajectory paths of the plurality of pedestrians based on the future exit points and at least one scene element of a map, and adjust the trajectory paths based on at least one predicted interaction between at least two of the plurality of pedestrians.

20 Claims, 6 Drawing Sheets

(56) References Cited

U.S. PATENT DOCUMENTS

| | | | | |
|---|---|---|---|---|
| 10,854,079 B2* | 12/2020 | Aoude | ............... | G08G 1/164 |
| 2005/0073438 A1* | 4/2005 | Rodgers | ............... | G08G 1/161 |
| | | | | 340/944 |
| 2016/0300485 A1* | 10/2016 | Ayvaci | ............... | G08G 1/166 |
| 2017/0344855 A1* | 11/2017 | Mande | ............... | G06K 9/6267 |

OTHER PUBLICATIONS

Kerfs, "Models for Pedestrian Trajectory Prediction and Navigation in Dynamic Environments," California Polytechnic State University, Thesis by Jeremy Kerfs, 146 pages (2017).

Asahara et al., "Pedestrian-movement prediction based on mixed Markov-chain model," In Proceedings of the 19th ACM SIGSPATIAL International Conference on Advances in Geographic Information Systems, 19 pages. ACM, 2011.

* cited by examiner

SYSTEM AND METHOD FOR PREDICTING THE MOVEMENT OF PEDESTRIANS

TECHNICAL FIELD

The subject matter described herein relates, in general, to systems and methods for predicting the movement of pedestrians.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some current vehicles have sensors that can detect objects found in the environment that the vehicle is operating within. Some of these detected objects include moving objects, such as other vehicles and pedestrians. Regarding pedestrians, the predicted movement of a pedestrian may be utilized by several downstream components of an autonomous vehicle system, such as path planning and decision-making.

Some current methodologies model the dynamics of pedestrian movement by directly relying on social, scene, and/or other cues. For example, some current methodologies use a "social forces" model that generates energy terms to avoid collisions with scene elements, other pedestrians in the scene, etc. Some other methodologies utilize a more data-driven approach to dynamic modeling by relying on deep models for learning underlying mechanics without explicit modeling.

SUMMARY

This section generally summarizes the disclosure and is not a comprehensive explanation of its full scope or all its features.

In one embodiment, a system for predicting the movement of a plurality of pedestrians includes one or more processors and a memory in communication with the one or more processors. The memory includes an initial trajectory module, an exit point prediction module, a path planning module, and an adjustment module. The initial trajectory module includes instructions that when executed by the one or more processors causes the one or more processors to obtain trajectories of the plurality of pedestrians. The exit point prediction module includes instructions that when executed by the one or more processors causes the one or more processors to predict future exit points for the plurality of pedestrians from a scene based on the trajectories of the plurality of pedestrians. The path planning module includes instructions that when executed by the one or more processors causes the one or more processors to determine trajectory paths of the plurality of pedestrians based on the future exit points and at least one scene element of a map, wherein the trajectory paths are paths the plurality of pedestrians are predicted to take to reach the future exit points. The adjustment module includes instructions that when executed by the one or more processors causes the one or more processors to adjust the trajectory paths based on at least one predicted interaction between at least two of the plurality of pedestrians.

In another embodiment, a method for predicting the movement of a plurality of pedestrians includes the steps of obtaining trajectories of the plurality of pedestrians, predicting future exit points for the plurality of pedestrians from a scene based on the trajectories of the plurality of pedestrians, determining trajectory paths of the plurality of pedestrians based on the future exit points and at least one scene element of a map, and adjusting the trajectory paths based on at least one predicted interaction between at least two of the plurality of pedestrians.

In yet another embodiment, a non-transitory computer-readable medium for predicting the movement of a plurality of pedestrians includes instructions that when executed by one or more processors cause the one or more processors to obtain trajectories of the plurality of pedestrians, predict future exit points for the plurality of pedestrians from a scene based on the trajectories of the plurality of pedestrians, determine trajectory paths of the plurality of pedestrians based on the future exit points and at least one scene element of a map, and adjust the trajectory paths based on at least one predicted interaction between at least two of the plurality of pedestrians.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described is a system and method for predicting the movement of one or more pedestrians. In one example, the system determines the exit points of the pedestrians from a scene based on the trajectory of the pedestrians. The exit points determined by the system may be determined using a mixture density network. Next, the system will then predict paths the pedestrians will take based on the exit points and at least one scene element. For example, the scene element could be a sidewalk that is located between the pedestrian and the future exit point. Most likely, the pedestrian will utilize the sidewalk to reach the exit point. As such, when predicting the path the pedestrian may take, the system may consider the scene elements in determining the predicted path.

The paths of the pedestrians will then be compared to determine if there are any expected interactions between any of the pedestrians, such as pedestrians crossing paths of one another at the same time, thus causing a collision. If it is determined that the potential interaction will occur between pedestrians, the system then adjusts the paths to comply with social cues, rules of the road, etc. For example, if it is determined that the paths of two pedestrians will result in a collision, the system will adjust the path to prevent the collision. The system may utilize a graph neural network to determine how the paths should be adjusted based on the interaction between the pedestrians, social cues, rules of the road, etc.

Figure 1:
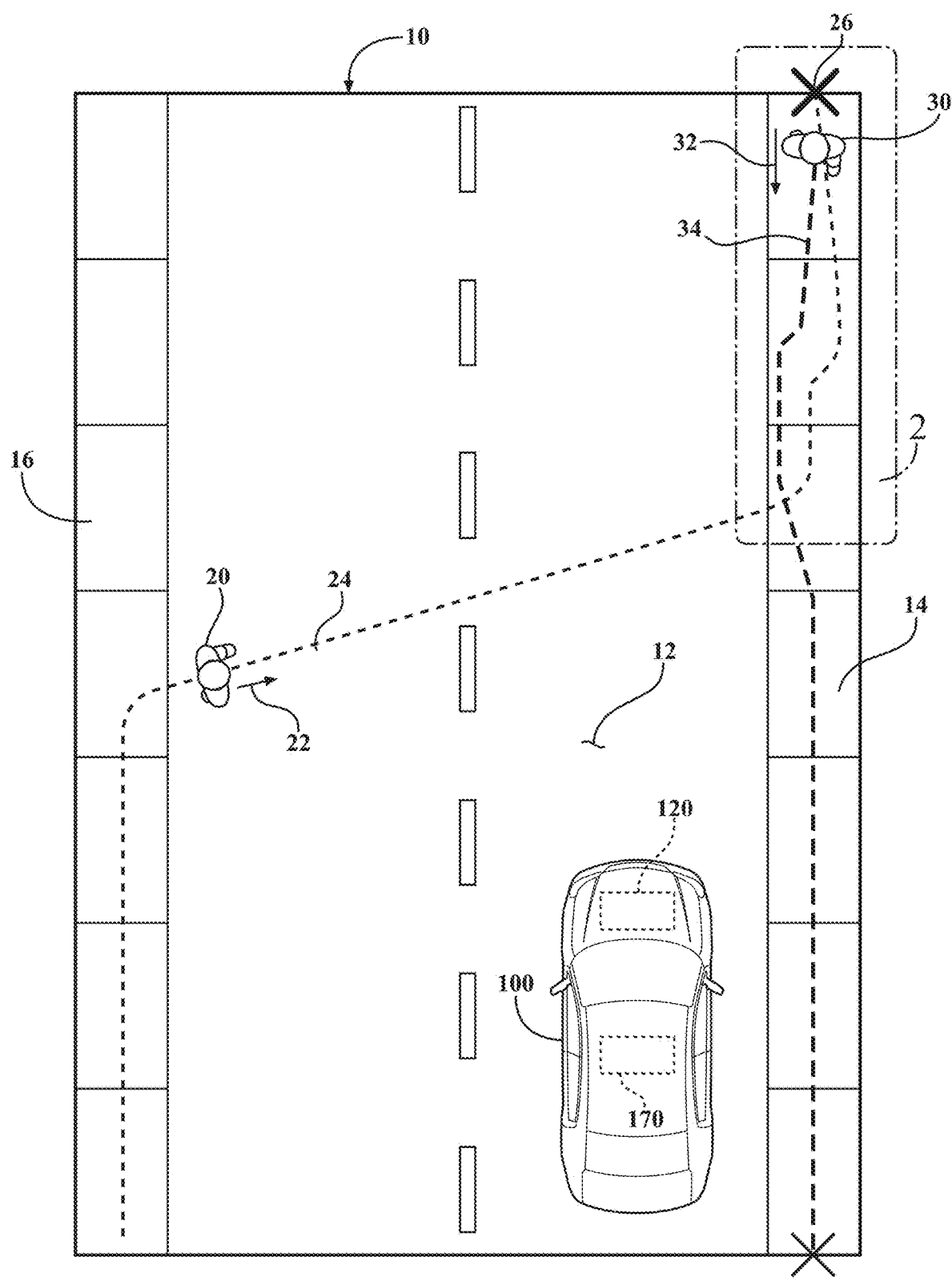
FIG. 1 illustrates a scene having a vehicle incorporating the system for predicting the movement of pedestrians.

Referring to FIG. 1, illustrated is a scene 10 that includes a vehicle 100 that has a sensor system 120 for perceiving one or more objects external to the vehicle 100 and a pedestrian prediction system 170. It should be understood that this scene 10 is just but one example to illustrate the pedestrian prediction system 170 which, as will be explained later, can determine the movement of one or more pedestrians within the scene 10. In this example, the vehicle 100 is traveling along a road 12. The road 12 is flanked by sidewalks 14 and 16. The sidewalks 14 and 16 may be sidewalks that allow pedestrians, bicyclists, and other nonautomotive related items to travel thereon.

Also located within the scene 10 are pedestrians 20 and 30. The pedestrian 20 is illustrated to have a trajectory shown with an arrow as trajectory 22. The trajectory 22 represents the location, direction, and/or speed in which the pedestrian 20 is moving. Similarly, the pedestrian 30 also has a trajectory 32 that is represented by an arrow. Like before, the trajectory 32 generally indicates the location, direction, and/or speed in which the pedestrian 30 is traveling. In this example, the pedestrian 20 is attempting to cross the road 12 from the sidewalk 16 to the sidewalk 14. As to the pedestrian 30, the pedestrian 30 is traveling along the sidewalk 14.

As will be explained in greater detail later, the pedestrian prediction system 170 is able to predict future exit points 26 and 36 of the pedestrians 20 and 30, respectively, from the scene 10. In this example, the pedestrian prediction system 170 has predicted that the pedestrian 20 will exit the scene 10 at future exit point 26 based on the trajectory 22 and one or more elements within the scene 10. The one or more elements of the scene 10 could include the sidewalks 14 and 16. As such, the pedestrian prediction system 170 has determined that the pedestrian 20 will exit the scene 10 at future exit point 26 based on the trajectory 22 which leads to the sidewalk 16, which is likely to be utilized by the pedestrian 20. Using these elements, the pedestrian prediction system 170 predicts the future exit point 26. A path 24 that the pedestrian 20 takes to the future exit point 26 will also be determined by the pedestrian prediction system 170. In like manner, as to the pedestrian 30, the pedestrian prediction system 170 also predicts the future exit point 36 as well as the path 34 that the pedestrian 30 will take to reach the future exit point 36.

Figure 2:
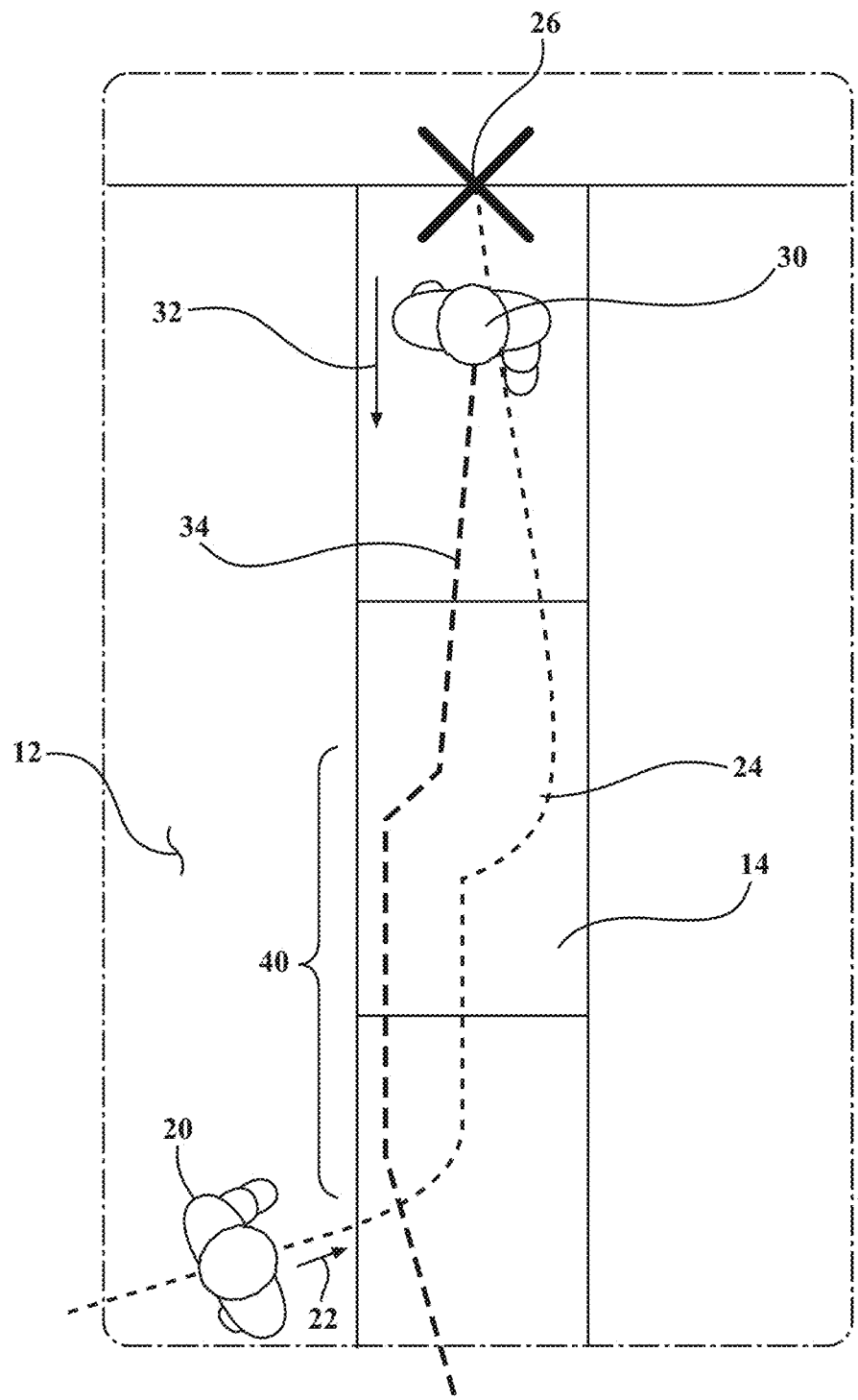
FIG. 2 illustrates a more detailed view of a predicted interaction between two pedestrians and adjusted paths predicted by the system of FIG. 1.

The pedestrian prediction system 170 also can adjust the paths 24 and 34 of the pedestrians 20 and 30, respectively, to consider the interaction that may occur between the pedestrians 20 and 30 as they proceed along the paths 24 and 34, respectively. For example, as best shown in FIG. 2, the paths 24 and 34 of the pedestrians 20 and 30, respectively, results in an area 40 that will result in a collision between the two. The system 170 has the ability to take no account these interactions to avoid a collision to more accurately predict the movement of the pedestrians, such as pedestrians 20 and 30. Furthermore, the movement of the pedestrians 20 and/or 30, or even other objects, can be utilized by one or more vehicle systems to control the vehicle 100. Again, the previous paragraphs are just to provide a general overview of the pedestrian prediction system 170. A more detailed explanation of the pedestrian prediction system 170 will be provided later in this disclosure.

Figure 3:
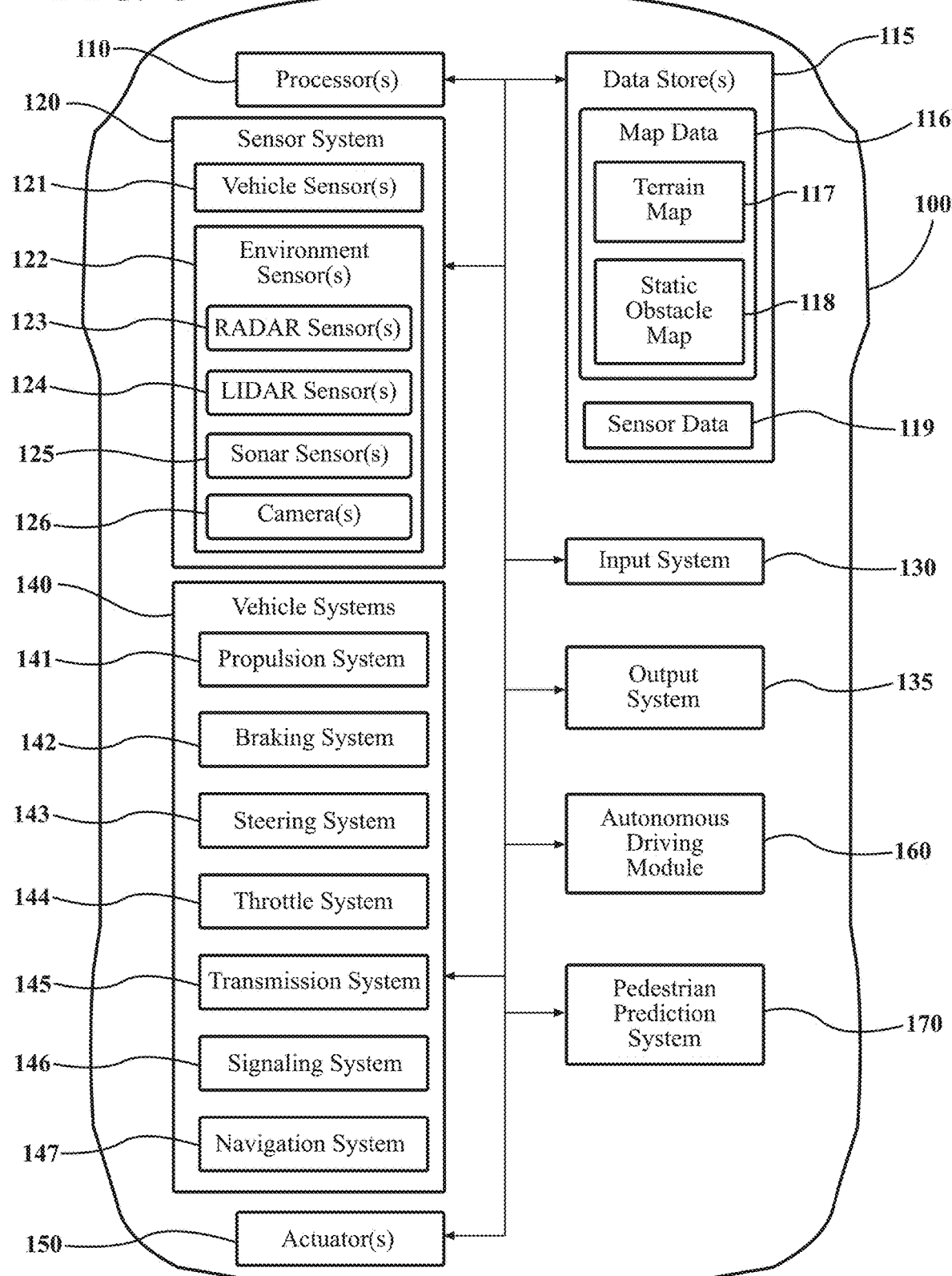
FIG. 3 illustrates a more detailed view of the vehicle incorporating the system for predicting the movement of pedestrians.

Referring to FIG. 3, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated or autonomous systems, and thus benefits from the functionality discussed herein.

In various embodiments, the automated/autonomous systems or combination of systems may vary. For example, in one aspect, the automated system is a system that provides autonomous control of the vehicle according to one or more levels of automation, such as the levels defined by the Society of Automotive Engineers (SAE) (e.g., levels 0-5). As such, the autonomous system may provide semi-autonomous control or fully autonomous control as discussed in relation to the autonomous driving module(s) 160.

The vehicle 100 also includes various elements. It will be understood that in various embodiments it may not be necessary for the vehicle 100 to have all the elements shown in FIG. 3. The vehicle 100 can have any combination of the various elements shown in FIG. 3. Further, the vehicle 100 can have additional elements to those shown in FIG. 3. In some arrangements, the vehicle 100 may be implemented without one or more of the elements shown in FIG. 3. While the various elements are shown as being located within the vehicle 100 in FIG. 3, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 3 and will be described along with subsequent figures. However, a description of many of the elements in FIG. 3 will be provided after the discussion of FIGS. 1 and 4-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. The embodiments described herein may be practiced using various combinations of these elements.

Figure 4:
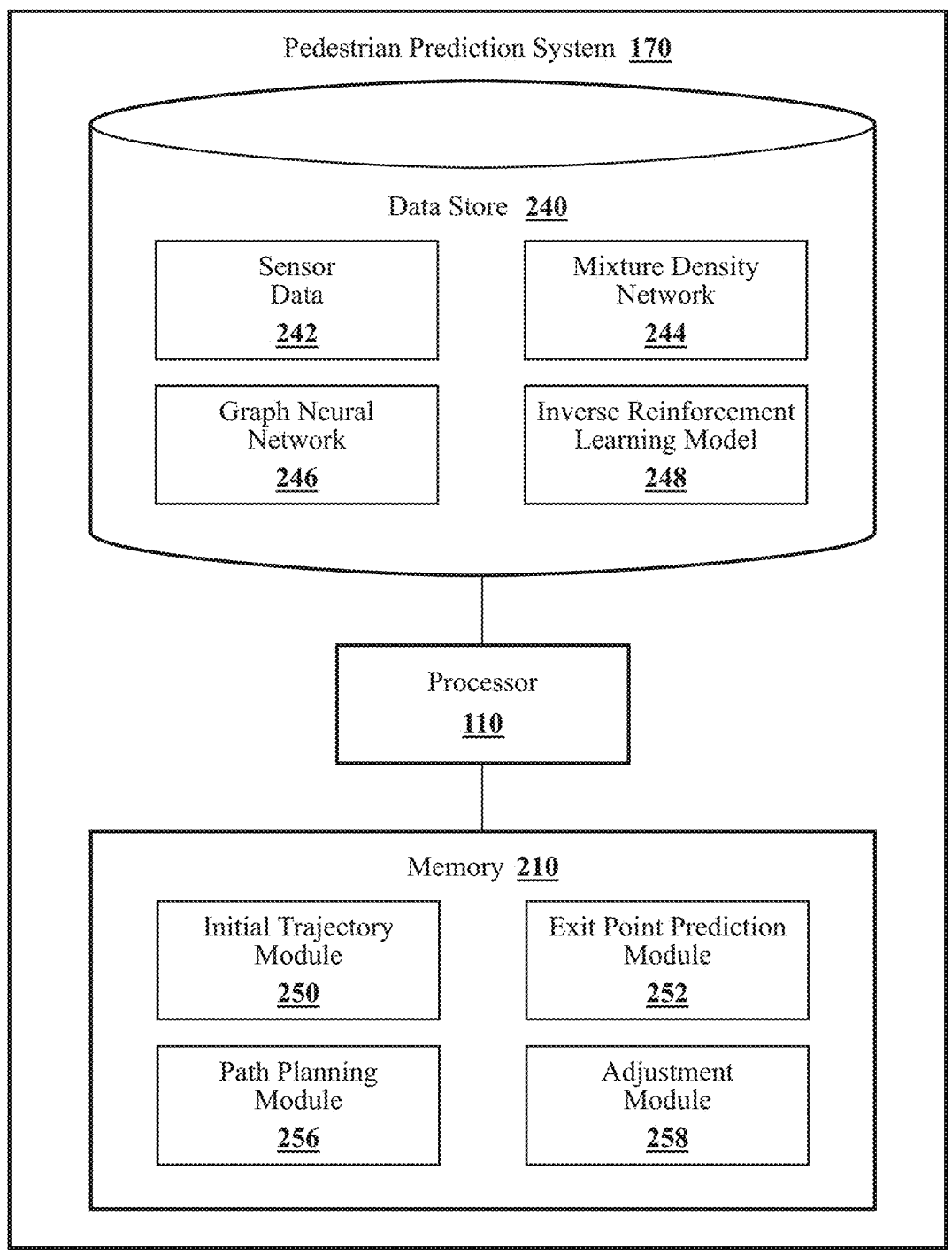
FIG. 4 illustrates a more detailed view of the system for predicting the movement of pedestrians.

In either case, the vehicle 100 includes the pedestrian prediction system 170. The pedestrian prediction system 170 may be incorporated within an autonomous driving module(s) 160 of the vehicle 100 or may be separate as shown. With reference to FIG. 4, one embodiment of the pedestrian prediction system 170 is further illustrated. As shown, the pedestrian prediction system 170 includes one or more processor(s) 110. Accordingly, the processor(s) 110 may be a part of the pedestrian prediction system 170 or the pedestrian prediction system 170 may access the processor(s) 110 through a data bus or another communication path. In one or more embodiments, the processor(s) 110 is an application-specific integrated circuit that is configured to implement functions associated with an initial trajectory module 250, an exit point prediction module 252, a path planning module 256, and an adjustment module 258. In general, the processor(s) 110 is an electronic processor such as a microprocessor that can perform various functions as described herein. In one embodiment, the pedestrian prediction system 170 includes a memory 210 that stores the initial trajectory module 250, the exit point prediction module 252, the path planning module 256, and the adjustment module 258. The memory 210 is a random-access memory (RAM), read-only memory (ROM), a hard disk drive, a flash memory, or other suitable memory for storing the modules 250, 252, 256, and 258. The modules 250, 252, 256, and 258 are, for example, computer-readable instructions that, when executed by the processor(s) 110, cause the processor(s) 110 to perform the various functions disclosed herein.

Furthermore, in one embodiment, the pedestrian prediction system 170 includes a data store 240. The data store 240 is, in one embodiment, an electronic data structure such as a database that is stored in the memory 210 or another memory and that is configured with routines that can be executed by the processor(s) 110 for analyzing stored data, providing stored data, organizing stored data, and so on. Thus, in one embodiment, the data store 240 stores data used by the modules 250, 252, 256, and 258 in executing various functions. In one embodiment, the data store 240 includes sensor data 242, along with, for example, other information that is used by the modules 250, 252, 256, and 258. The sensor data 242 may include some or all of the sensor data 119 shown in FIG. 3 and described later in this disclosure.

In addition to the sensor data 242, the data store 240 may also include other information that may be utilized by the modules 250, 252, 256, and 258 in executing various functions. In one example, the data store 240 may also include one or more artificial intelligence models. For example, the data store 240 may include a mixture density network 244, a graph neural network 246, and an inverse reinforcement learning model 248. As will be explained later, the exit point prediction module 252 may utilize the mixture density network 244 to predict the exit points from the scene 10. The path planning module 256 may utilize an inverse reinforcement learning model to determine the trajectory path of the pedestrian in isolation. The adjustment module 258 may utilize the graph neural network 246 to adjust the path of the pedestrian to account for any interactions with other pedestrians, such as collisions.

Accordingly, the initial trajectory module 250 includes instructions that, when executed by the processor or 110, causes the processor(s) 110 to obtain trajectories of the plurality of pedestrians from a scene, such as the pedestrians 20 and 30 from scene 10. In one example, the scene 10 may be a bird's eye view. The scene 10 may be a static scene or may be moving based on the movement of one or more objects. In one example, the movement of a vehicle incorporating the pedestrian prediction system 170, such as the vehicle 100 of FIG. 3, may be utilized to determine the overall movement of the scene 10, if the scene 10 is a moving scene. For example, the scene 10 could be a radius located around the vehicle 100 and moves as the vehicle 100 moves.

The trajectories 22 and 32 of the pedestrians 20 and 30, respectively, may be obtained from other systems and subsystems located within the vehicle 100. In one example, the sensor system 120 of the vehicle 100 is able to detect the presence and movement of the pedestrians 20 and/or 30. In addition, the sensor system 120 can utilize information received from one or more environment sensors 122 to determine the trajectories 22 and/or 32, which may include the location, directions in which the pedestrians 20 and 30 are traveling, as well as the velocity of the pedestrians 20 and 30.

The exit point prediction module 252 may include instructions that, when executed by the processor(s) 110, cause the processor(s) 110 to predict exit points, such as future exit points 26 and 36 of the pedestrians 20 and 30, respectively. Given the previous trajectory of the pedestrians 20 and 30 and a crop of the semantic map or scene 10 centered around the trajectories 22 and 32, the exit point prediction module 252 may predict the future exit points 26 and 36 of the pedestrians 20 and 30, respectively.

The exit point prediction module 252 may use the mixture density network 244 to maintain a mixture of wrapped normal distributions on the image or scene boundary, which approximates the future exit points given the trajectories. The mixture density network 244 may be a class of one or more models obtained by combining a conventional neural network with a mixed density model. The mixture density network 244 outputs parameters of a mixture of probability distributions along with weights for combining the component distributions. In this example, the mixture density network 244 can determine the future exit points 26 and 36 of the pedestrians 20 and 30 based on the trajectories 22 and 32 of the pedestrians 20 and 30, respectively, as well as one or more scene elements.

Scene elements can include elements located within the scene 10. In the example shown in FIG. 1, the scene elements include the road 12 as well as the sidewalks 14 and 16. It is generally understood that pedestrians, such as pedestrians 20 and 30, will generally utilize sidewalks, such as sidewalks 14 and 16, and generally follow rules of the road. In this example, the pedestrian 20 has already begun crossing the road 12 that does not include a crosswalk. However, based on the trajectory 22 of the pedestrian 20 toward the sidewalk 14, the mixture density network 244 may determine that the pedestrian 20 is likely to continue along the same direction to reach the sidewalk 14 and continue along the sidewalk 14 to the future exit point 26. Similarly, the mixture density network 244 may determine based on the trajectory 32 of the pedestrian 30 that the pedestrians 30 is likely to continue walking down the sidewalk 14 and exit the scene 10 at future exit point 36.

The path planning module 256 includes instructions that, when executed by the processor(s) 110, causes the processor(s) 110 to predict the path of a pedestrian in isolation. Moreover, future exit points, such as future exit points 26 and 36, are sampled from the exit point prediction module 252 and fed into path planning module 256. The path planning module 256 plans human-like trajectories (or paths) for the pedestrians to achieve their goal of reaching the exit point, as predicted by the exit point prediction module 252.

In this example, the path of the pedestrian in isolation may be interpreted as the path in which the pedestrian us predicted to travel. For example, referring back to FIG. 1, the pedestrian 20 has been determined by the path planning module 256 to travel along the path 24, while the pedestrian 30 has been determined to travel along the path 34. The path planning module 256 may utilize the trajectories 22 and 32 previously determined by the initial trajectory module 250 as well as the future exit points 26 and/or 36 predicted by the exit point prediction module 252. In addition to these inputs, other inputs could also be utilized by the path planning module 256, such as rules of the road. For example, it is generally assumed that pedestrians will follow the rules of the road such as utilizing appropriate locations to cross the road 12, use of sidewalks, and following road signals, such as stop signs, traffic lights, etc.

The path planning module 256 may utilize the inverse reinforcement learning model 248. Inverse reinforcement learning is a machine-learning framework that can solve the inverse problem of reinforcement learning. Moreover, inverse reinforcement learning is about learning an agent's objectives, values, or rewards by observing its behavior. For example, a traditional reinforcement learning setting generally requires that the goal is to learn a decision process to produce behavior that maximizes some predefined reward function. Inverse reinforcement learning generally reverses the problem and instead attempts to extract the reward function from the observed behavior of an agent, such as the pedestrians 20 and 30.

The adjustment module 258 includes instructions that, when executed by the processor(s) 110, adjusts the trajectory paths determined by the path planning module 256 to account for interactions between one or more the pedestrians. Given the long-term trajectory of each pedestrian present in the scene, all these trajectories are negotiated and adjusted to avoid a collision and/or follow the prevalent social cues and rules of the road. This is achieved by embedding the trajectories as node features in the graph neural network 246, which follows a message-passing algorithm to adjust these predictions.

For example, referring back to FIG. 1, it was previously described that the pedestrian 20 and the pedestrian 30 would collide with each other if their paths 24 and 34 were not changed. In order to determine if a collision will occur, the adjustment module 258 configures the processor(s) 110 to determine if the paths 24 and 34 of the pedestrians cross. In addition, to determine if there is a crossing of paths 24 and 34, the adjustment module 258 also configures the processor(s) 110 to determine if the pedestrians will collide into each other if they continue down the paths 24 and 34 at the predicted rate of speed. Moreover, in some examples, the paths of the pedestrians may cross, but no collision will occur because of the location and speed of the pedestrians. However, in other situations, the speed and position of the pedestrians and the overlapping trajectory paths indicate that a collision will occur.

In the event of an interaction between the pedestrians, such as a collision is predicted to occur, the adjustment module 258 adjusts the trajectory paths of the pedestrians, such as project trajectory past 24 and 34 of the pedestrians 20 and 30 respectively. The adjustment module 258 may utilize the graph neural network 246 to adjust the trajectory paths of the pedestrian to avoid a collision, as would be expected, as pedestrians generally do not collide into each other on purpose.

The graph neural network 246 structure is a type of neural network that directly operates on a graph structure. As such, graph neural networks can operate on graphs with more complex geometry and topology. This can include social networks, three-dimensional meshes, and physical systems. As such, the graph neural network 246 can be utilized for negotiating social interactions between pedestrians to avoid collisions and more accurately predict the movement of pedestrians, such as pedestrians 20 and 30. As such, with reference to FIG. 2, the adjustment module 258 has adjusted the paths 24 and 34 to avoid a direct collision between the pedestrians 20 and 30, respectively. By utilizing the ability of the graph neural network 246 to consider social interactions, such as the desire for pedestrians to avoid colliding into each other and other social cues, the pedestrian prediction system 170 can more accurately predict the movement of pedestrians within a scene.

Figure 5:
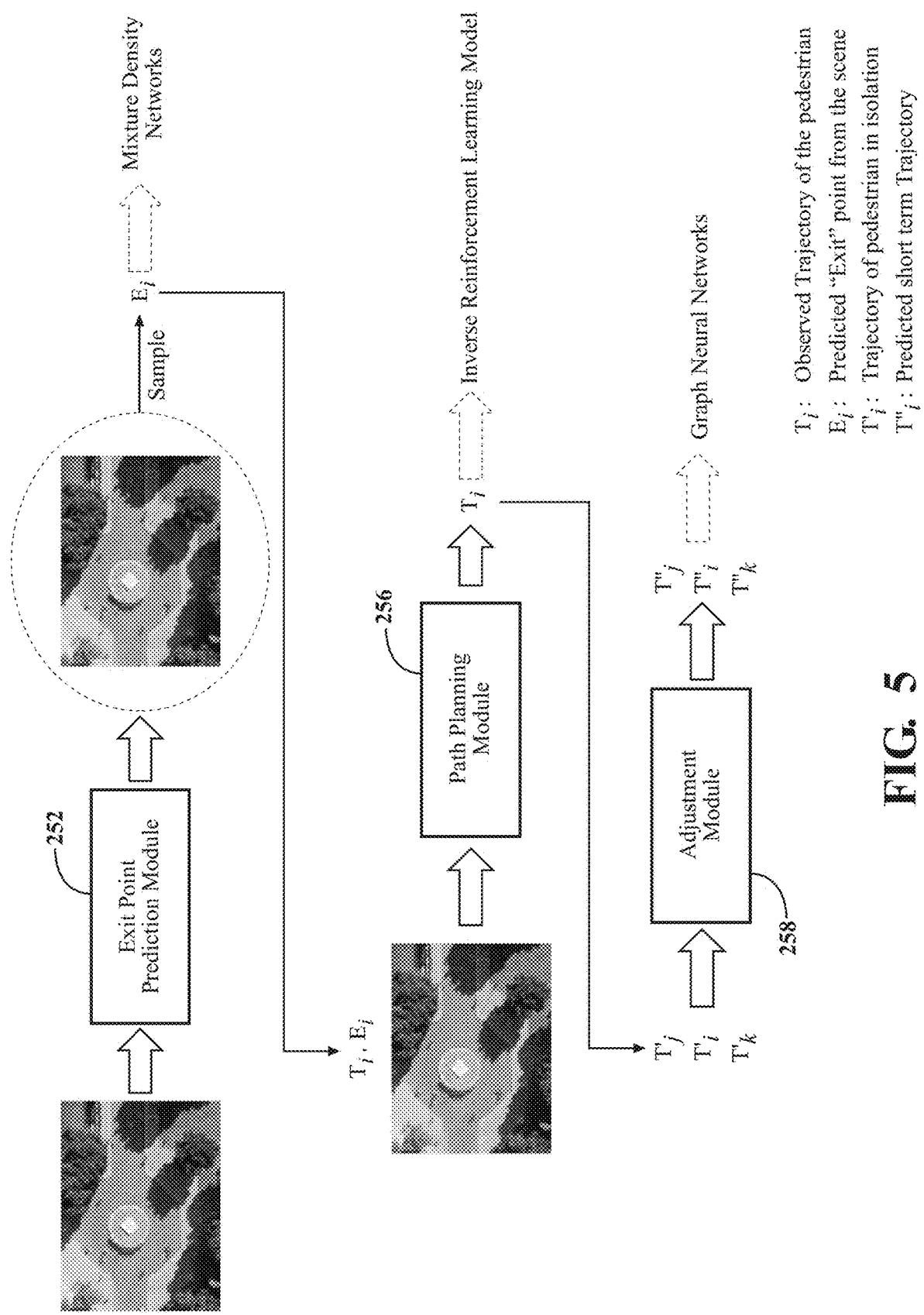
FIG. 5 illustrates a flow diagram illustrating one example of the process utilized by the system for predicting the movement of pedestrians.

In order to better illustrate the different types of artificial intelligence networks and models that may be utilized, reference is made to FIG. 5. In this example, the scene is static, but scene does not need to be static and can move as an ego vehicle move by using motion compensation. Moreover, FIG. 5 illustrates the exit point prediction module 252, the path planning module 256, and the adjustment module 258. In addition, FIG. 5 illustrates the flow of information indicating that the exit point prediction module 252, the path planning module 256, and the adjustment module 258 may be daisy-chained together, wherein the output of the exit point prediction module 252 is fed into the path planning module 256, which then feeds into the adjustment module 258. As such, in this example, three different types of artificial intelligent models are utilized. Moreover, the exit point prediction module 252 utilizes the mixture density network 224, the path planning module 256 utilizes the inverse reinforcement learning model 248, and the adjustment module 258 utilizes a graph neural network 246.

The final output from the adjustment module 258 then becomes the short-term predicted trajectory for that pedestrian. Note that this way, the pedestrian prediction system 170 considers the shorter-term information like social cues but also longer temporal signals like goals and static scene elements.

Figure 6:
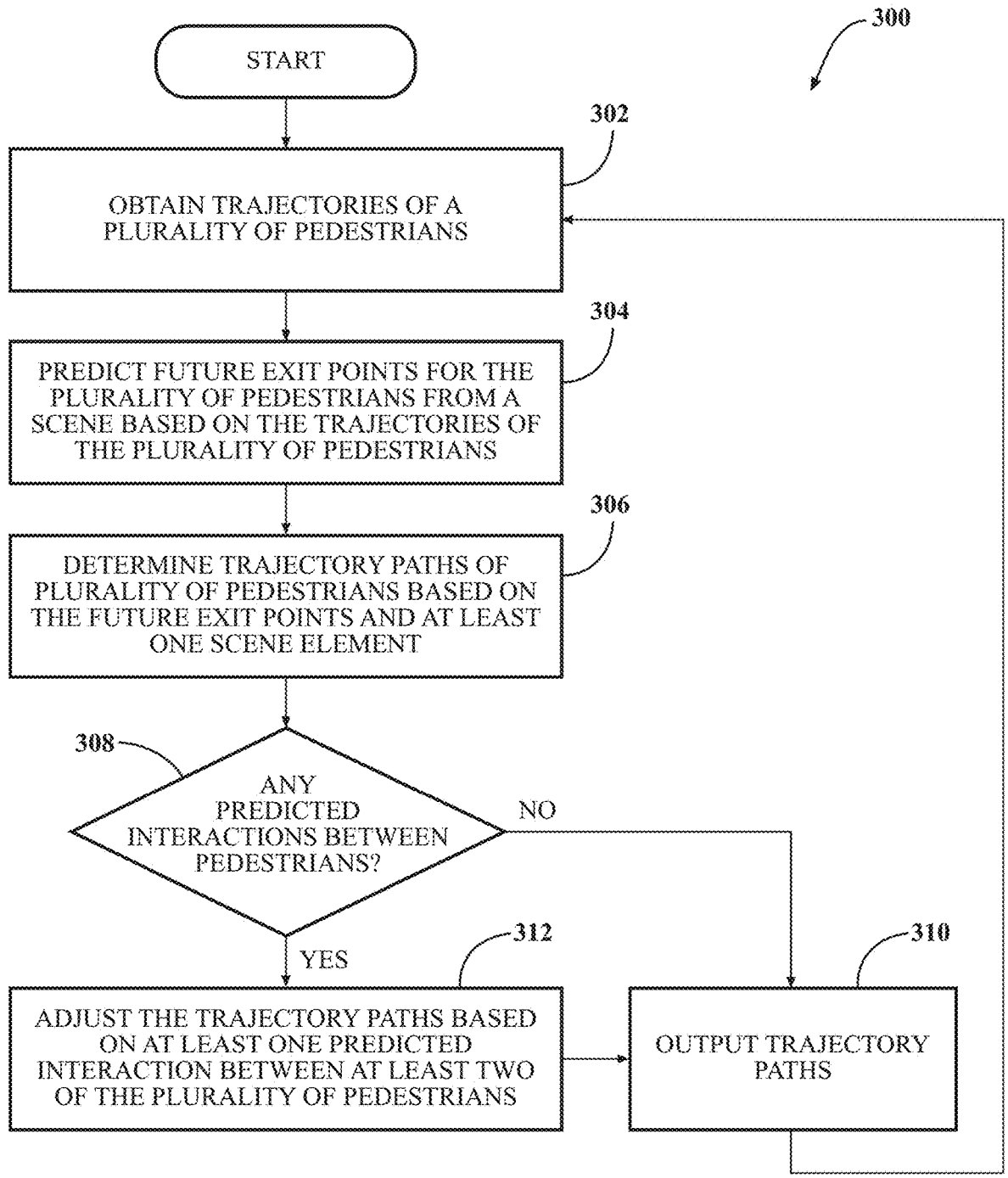
FIG. 6 illustrates a method for predicting the movement of pedestrians.

Referring to FIG. 6, a method 300 for predicting the movement of pedestrians is shown. The method 300 will be described from the viewpoint of the vehicle 100 of FIG. 3 and the pedestrian prediction system 170 of FIG. 4. However, this is just one example of implementing the method 300. While method 300 is discussed in combination with the pedestrian prediction system 170, it should be appreciated that the method 300 is not limited to being implemented within the pedestrian prediction system 170, but is instead one example of a system that may implement the method 300.

The method 300 begins at step 302, wherein the initial trajectory module 250 causes the processor(s) 110 to obtain trajectories of a plurality of pedestrians. In this example, the initial trajectory module 250 may receive one or more trajectories, such as the trajectories 22 and 32 of the pedestrians 20 and 30, respectively. The trajectories 22 and 32 of the pedestrians 20 and 30, respectively, may be obtained from other systems and subsystems located within the vehicle 100. In one example, the sensor system 120 of the vehicle 100 is able to detect the presence and movement of the pedestrians 20 and/or 30. In addition, the sensor system 120 can utilize information received from one or more environment sensors 122 to determine the trajectories 22 and/or 32, which may include the location, directions in which the pedestrians 20 and 30 are traveling, as well as the velocity of the pedestrians 20 and 30.

In step 304, the exit point prediction module 252 causes the processor(s) 110 to determine one or more exit points, such as the future exit points 26 and 36 related to the pedestrians 20 and 30, respectively. As explained previously, the exit point prediction module 252 may use the mixture density network 244 to maintain a mixture of wrapped normal distributions on the image or scene boundary, which approximates the future exit points given the trajectories. The mixture density network 244 may be a class of one or more models obtained by combining a conventional neural network with a mixed density model. The mixture density network 244 outputs parameters of a mixture of probability distributions along with weights for combining the component distributions. In this example, the mixture density network 244 can determine the future exit points 26 and 36 of the pedestrians 20 and 30 based on the trajectories 22 and 32 of the pedestrians 20 and 30, respectively, as well as one or more scene elements.

Scene elements can include elements located within the scene 10. In the example shown in FIG. 1, the scene elements include the road 12 as well as the sidewalks 14 and 16. It is generally understood that pedestrians, such as pedestrians 20 and 30, will generally utilize sidewalks, such as sidewalks 14 and 16, and generally follow rules of the road. In this example, the pedestrian 20 has already begun crossing the road 12 that does not include a crosswalk. However, based on the trajectory 22 of the pedestrian 20 toward the sidewalk 14, the mixture density network 244 may determine that the pedestrian 20 is likely to continue along the same direction to reach the sidewalk 14 and continue along the sidewalk 14 to the future exit point 26. Similarly, the mixture density network 244 may determine based on the trajectory 32 of the pedestrian 30 that the pedestrians 30 is likely to continue walking down the sidewalk 14 and exit the scene 10 at future exit point 36.

In step 306, the path planning module 256 causes the processor(s) 110 to determine trajectory passive the plurality of pedestrians 20 and 30 based on the future exit points 26 and 36, respectively, and at least one element of the scene 10. Moreover, future exit points, such as future exit points 26 and 36, are sampled from the exit point prediction module 252 and fed into path planning module 256. The path planning module 256 plans human-like trajectories (or paths) for the pedestrians to achieve their goal of reaching the exit point, as predicted by the exit point prediction module 252.

In this example, the path of the pedestrian in isolation may be interpreted as the path in which the pedestrian us predicted to travel. For example, referring back to FIG. 1, the pedestrian 20 has been determined by the path planning module 256 to travel along the path 24, while the pedestrian 30 has been determined to travel along the path 34. The path planning module 256 may utilize the trajectories 22 and 32 previously determined by the initial trajectory module 250 as well as the future exit points 26 and/or 36 predicted by the exit point prediction module 252. In addition to these inputs, other inputs could also be utilized by the path planning module 256, such as rules of the road. For example, it is generally assumed that pedestrians will follow the rules of the road such as utilizing appropriate locations to cross the road 12, use of sidewalks, and following road signals, such as stop signs, traffic lights, etc.

In step 308, the adjustment module 258 causes the processor(s) 110 to determine if there are any interactions predicted between the pedestrians 20 and 30. For example, using the locations, trajectories 22 and 32, and the paths 24 and 34 of the pedestrians 20 and 30, respectively, the adjustment module 258 can cause the processor(s) 110 to determine if there is a likelihood of a collision or interaction between the pedestrians 20 and 30. If there is no detected interaction between any of the pedestrians, the trajectory paths previously computed may be output, as indicated in step 310. In one example, the previously computed trajectory paths may be output to one or more vehicle systems or subsystems, such as the autonomous driving module(s) 160.

If it is determined that the pedestrians are likely to interact with one another, the method proceeds to step 312, wherein the adjustment module 258 causes the processor(s) 110 to adjust the paths 24 and 34 based on the predicted interaction between the pedestrians 20 and 30. The adjustment module 258 adjusts the trajectory paths of the pedestrians, such as predicted paths 24 and 34 of the pedestrians 20 and 30 respectively. The adjustment module 258 may utilize the graph neural network 246 to adjust the trajectory paths of the pedestrian to avoid a collision, as would be expected, as pedestrians generally do not collide into each other on purpose. Once the paths 24 and 34 have been adjusted by the adjustment module 258, the trajectory paths may be outputted to one or more vehicle systems or subsystems, such as the autonomous driving module(s) 160, as indicated in step 310.

FIG. 3 will now be discussed in full detail as an example environment within which the system and methods disclosed herein may operate. In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the pedestrian prediction system 170 to ensure the vehicle 100 remains within defined state constraints.

The vehicle 100 can include one or more processor(s) 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain map(s) 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle map(s) 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data stores 115, and/or another element of the vehicle 100 (including any of the elements shown in FIG. 3). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensor(s) 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensor(s) 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 3. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the pedestrian prediction system 170, and/or the autonomous driving module(s) 160 can be operatively connected to communicate with the various vehicle systems 140 and/or individual components thereof. For example, returning to FIG. 3, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the pedestrian prediction system 170, and/or the autonomous driving module(s) 160 may control some or all of these vehicle systems 140 and, thus, may be partially or fully autonomous.

The processor(s) 110, the pedestrian prediction system 170, and/or the autonomous driving module(s) 160 can be operatively connected to communicate with the various vehicle systems 140 and/or individual components thereof. For example, returning to FIG. 3, the processor(s) 110, the pedestrian prediction system 170, and/or the autonomous driving module(s) 160 can be in communication to send and/or receive information from the various vehicle systems 140 to control the movement, speed, maneuvering, heading, direction, etc. of the vehicle 100. The processor(s) 110, the pedestrian prediction system 170, and/or the autonomous driving module(s) 160 may control some or all of these vehicle systems 140.

The processor(s) 110, the pedestrian prediction system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the pedestrian prediction system 170, and/or the autonomous driving module(s) 160 can control the direction and/or speed of the vehicle 100. The processor(s) 110, the pedestrian prediction system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving module(s) 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the pedestrian prediction system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by the transmission module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for predicting movement of a plurality of pedestrians comprising:
one or more processors;
a memory in communication with the one or more processors, the memory having an initial trajectory module, an exit point prediction module, a path planning module, and an adjustment module;
wherein the initial trajectory module includes instructions that when executed by the one or more processors causes the one or more processors to obtain trajectories of the plurality of pedestrians;
wherein the exit point prediction module includes instructions that when executed by the one or more processors causes the one or more processors to predict future exit points for the plurality of pedestrians from a scene based on the trajectories of the plurality of pedestrians;
wherein the path planning module includes instructions that when executed by the one or more processors causes the one or more processors to determine trajectory paths of the plurality of pedestrians based on the future exit points and at least one scene element of a map, wherein the trajectory paths are paths the plurality of pedestrians are predicted to take to reach the future exit points; and
wherein the adjustment module includes instructions that when executed by the one or more processors causes the one or more processors to adjust the trajectory paths based on at least one predicted interaction between at least two of the plurality of pedestrians.

2. The system of claim 1, wherein at least one predicted interaction is a collision.

3. The system of claim 2, wherein the adjustment module further comprises instructions that when executed by the one or more processors causes the one or more processors to adjust the trajectory paths of the at least two of the plurality of pedestrians to avoid the collision between the at least two of the plurality of pedestrians.

4. The system of claim 1, wherein the initial trajectory module further comprises instructions that when executed by the one or more processors causes the one or more processors to obtain the trajectories of the plurality of pedestrians by using a mixed density network model.

5. The system of claim 1, wherein the adjustment module further comprises instructions that when executed by the one or more processors causes the one or more processors to adjust trajectory paths based on the at least one predicted interaction between at least two of the plurality of pedestrians by utilizing a graph neural network model.

6. The system of claim 5, wherein the trajectories for the plurality of pedestrians are embedded into the graph neural network model as node features of the graph neural network model.

7. The system of claim 1, wherein the scene is a fixed scene.

8. The system of claim 1, wherein the scene moves based on a movement of an ego vehicle.

9. A method for predicting movement of a plurality of pedestrians, the method comprising the steps of:
obtaining trajectories of the plurality of pedestrians;
predicting future exit points for the plurality of pedestrians from a scene based on the trajectories of the plurality of pedestrians;
determining trajectory paths of the plurality of pedestrians based on the future exit points and at least one scene element of a map, wherein the trajectory paths are paths the plurality of pedestrians are predicted to take to reach the future exit points; and
adjusting the trajectory paths based on at least one predicted interaction between at least two of the plurality of pedestrians.

10. The method of claim 9, wherein at least one predicted interaction is a collision.

11. The method of claim 10, further comprising the step of adjusting the trajectory paths of the at least two of the plurality of pedestrians to avoid the collision between the at least two of the plurality of pedestrians.

12. The method of claim 9, wherein the step of obtaining the trajectories of the plurality of pedestrians is performed by a mixed density network model.

13. The method of claim 9, wherein the step of adjusting the trajectory paths based on the at least one predicted interaction between at least two of the plurality of pedestrians is performed by a graph neural network model.

14. The method of claim 13, wherein the trajectories for the plurality of pedestrians are embedded into the graph neural network model as node features of the graph neural network model.

15. The method of claim 9, wherein the scene is a fixed scene.

16. The method of claim 9, wherein the scene moves based on a movement of an ego vehicle.

17. A non-transitory computer-readable medium for predicting movement of a plurality of pedestrians, the non-transitory computer-readable medium comprising instructions that when executed by one or more processors cause the one or more processors to:
obtain trajectories of the plurality of pedestrians;
predict future exit points for the plurality of pedestrians from a scene based on the trajectories of the plurality of pedestrians;
determine trajectory paths of the plurality of pedestrians based on the future exit points and at least one scene element of a map, wherein the trajectory paths are paths the plurality of pedestrians are predicted to take to reach the future exit points; and
adjust the trajectory paths based on at least one predicted interaction between at least two of the plurality of pedestrians.

18. The non-transitory computer-readable medium of claim 17, wherein at least one predicted interaction is a collision.

19. The non-transitory computer-readable medium of claim 18, wherein the non-transitory computer-readable medium further comprises instructions that when executed by one or more processors cause the one or more processors to adjust the trajectory paths of the at least two of the plurality of pedestrians to avoid the collision between the at least two of the plurality of pedestrians.

20. The non-transitory computer-readable medium of claim 17, wherein the scene moves based on a movement of an ego vehicle.

* * * * *